United States Patent
Park et al.

(10) Patent No.: US 9,384,385 B2
(45) Date of Patent: Jul. 5, 2016

(54) FACE RECOGNITION USING GRADIENT BASED FEATURE ANALYSIS

(71) Applicant: Intel Corporation, Santa Clara, CA (US)

(72) Inventors: Minje Park, Seongnam (KR); Hyungsoo Lee, Seoul (KR); Hongmo Je, Guemchun-Gu (KR); Tae-Hoon Kim, Seoul (KR); Yeongjae Cheon, Seoul (KR); Taesup Kim, Seoul (KR)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/535,133

(22) Filed: Nov. 6, 2014

(65) Prior Publication Data

US 2016/0132718 A1    May 12, 2016

(51) Int. Cl.
| | |
|---|---|
| G06K 9/00 | (2006.01) |
| G06K 9/52 | (2006.01) |
| G06T 7/00 | (2006.01) |
| G06K 9/62 | (2006.01) |
| G06K 9/46 | (2006.01) |

(52) U.S. Cl.
CPC .......... *G06K 9/00288* (2013.01); *G06K 9/4642* (2013.01); *G06K 9/52* (2013.01); *G06K 9/6201* (2013.01); *G06K 9/6215* (2013.01); *G06T 7/0042* (2013.01)

(58) Field of Classification Search
None
See application file for complete search history.

(56) References Cited

U.S. PATENT DOCUMENTS

| | | | | |
|---|---|---|---|---|
| 5,905,807 | A | 5/1999 | Kado et al. | |
| 7,697,792 | B2 * | 4/2010 | Keating | G06F 17/3025 382/162 |
| 8,189,866 | B1 * | 5/2012 | Gu | G06K 9/00335 348/169 |
| 8,356,035 | B1 * | 1/2013 | Baluja | G06F 17/30247 707/741 |
| 9,208,402 | B2 * | 12/2015 | Swaminathan | G06K 9/00288 |

(Continued)

FOREIGN PATENT DOCUMENTS

CN    102324022 B    3/2013

OTHER PUBLICATIONS

Wang et al., "Mining weakly labeled web facial images for search-based face annotation", IEEE Transactions on Knowledge and Data Engineering, vol. 26, No. 1, Jan. 2014.*

(Continued)

*Primary Examiner* — Soo Park
(74) *Attorney, Agent, or Firm* — Schwabe, Williamson & Wyatt, P.C.

(57) ABSTRACT

Computer-readable storage media, computing devices and methods are discussed herein. In embodiments, a computing device may be configured to perform facial recognition based on gradient based feature extractions of images of faces. In embodiments, the computing device may be configured to determine directional matching patterns of the images from the gradient based feature extraction and may utilize these directional matching patterns in performing a facial recognition analysis of the images of faces. Other embodiments may be described and/or claimed.

19 Claims, 8 Drawing Sheets

(56) References Cited

U.S. PATENT DOCUMENTS

| | | | |
|---|---|---|---|
| 2004/0062424 A1 | 4/2004 | Mariani et al. | |
| 2005/0180626 A1 | 8/2005 | Moon et al. | |
| 2010/0086215 A1* | 4/2010 | Bartlett | G06K 9/00335 |
| | | | 382/197 |
| 2011/0199505 A1* | 8/2011 | Teranishi | 348/222.1 |
| 2012/0269389 A1* | 10/2012 | Nakano et al. | 382/103 |
| 2012/0294496 A1* | 11/2012 | Nakamoto | 382/118 |
| 2013/0162798 A1 | 6/2013 | Hanna et al. | |
| 2014/0226877 A1* | 8/2014 | Je et al. | 382/118 |
| 2015/0154229 A1* | 6/2015 | An et al. | 382/118 |

OTHER PUBLICATIONS

International Search Report and Written Opinion mailed Dec. 23, 2015 for International Application No. PCT/US2015/054065, 15 pages.

* cited by examiner

FACE RECOGNITION USING GRADIENT BASED FEATURE ANALYSIS

TECHNICAL FIELD

Embodiments of the present disclosure are related to the field of face recognition, and in particular, to face recognition using gradient based feature analysis.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Automatic identification of human faces via facial recognition is a challenging endeavor. Although progress has been made, it may still be challenging to achieve acceptable performance of facial recognition with limited computing resources, especially with regard to faces in a variety of poses or in dynamic lighting conditions. Under the current state-of-the-art deep learning may be utilized in facial recognition. Deep learning, however, is based on very large-scale data models and convolutional neural networks. While the accuracy of deep learning is reported to be almost that of humans, deep learning needs an abundance of computing resources for the necessary computations.

DETAILED DESCRIPTION OF ILLUSTRATIVE EMBODIMENTS

Figure 1:
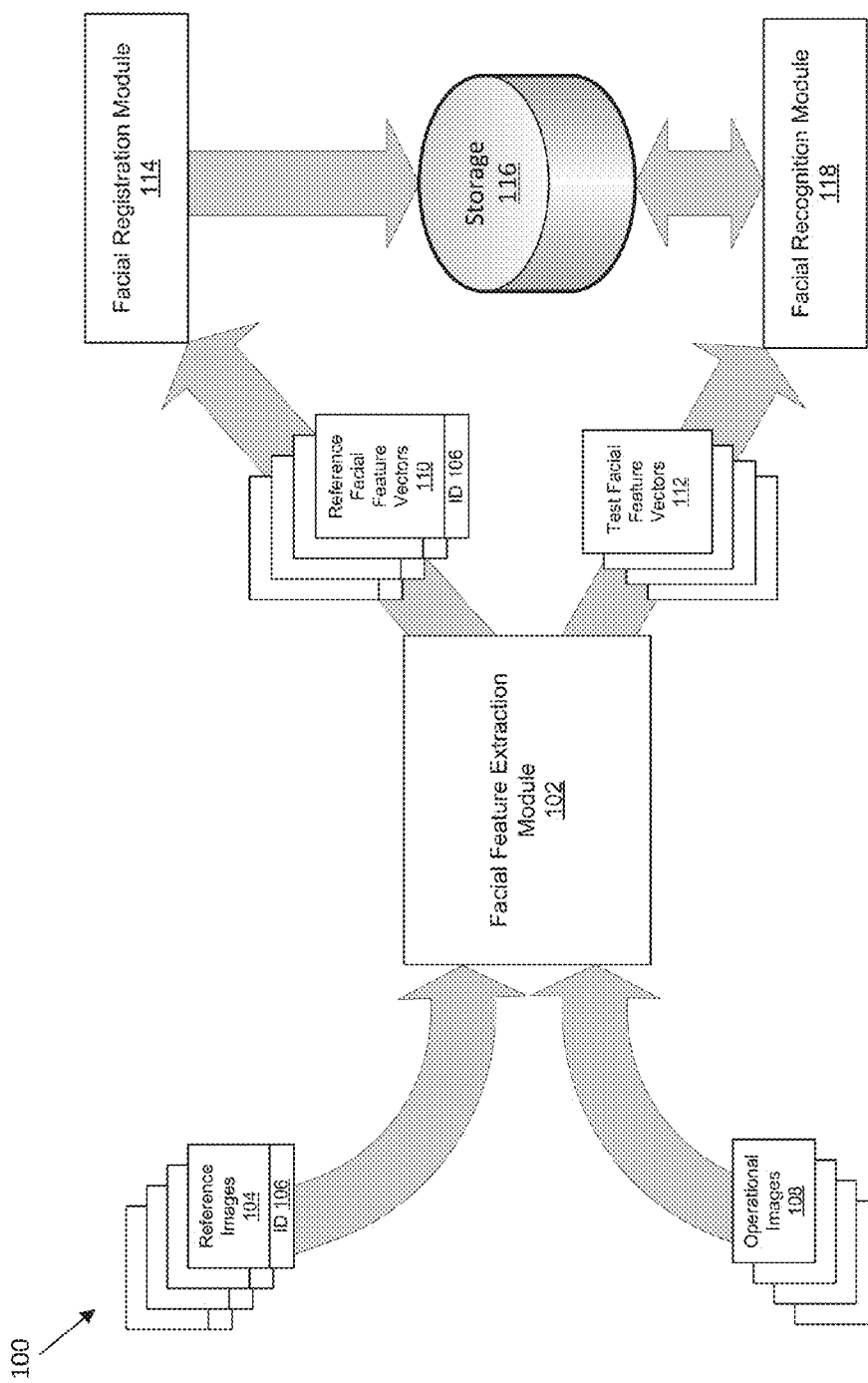
FIG. 1 depicts an illustrative facial recognition system, in accordance with various embodiments of the present disclosure.

Methods, computer-readable media, and computing devices associated with facial recognition are described herein. In embodiments, a computing device may include a facial feature extraction module, a facial registration module, and a facial recognition module. The facial feature extraction module may take as input operational images and reference images including faces of persons. The reference images may be associated with corresponding identifiers of the persons whose faces are included therein. The facial feature extraction module may extract gradient based features from the operational images and the reference images. These gradient based features may be utilized to define directional flows associated with the faces in the operational images and the reference images. The facial feature extraction module may further generate facial feature vectors that represent the directional flows of the faces within the images. Facial registration module may store the facial feature vectors generated from reference images as reference facial feature vectors along with the corresponding identifiers. Facial recognition module on the other hand may utilize facial feature vectors generated from the operational images as test facial feature vectors to utilize in comparing the faces included in the operational images with those faces included in the reference images. Such a comparison may be based on a level of similarity between the directional flows of the operational images and the directional flows of the reference images. The directional flow analysis for facial recognition requires much fewer computing resources than conventional facial recognition applications while achieving the same or similar accuracy. In addition, various facial poses/expressions as well as dynamic lighting conditions have far less of an impact on the directional flow analysis described herein as compared with conventional facial recognition applications.

In the following detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

FIG. 1 depicts an illustrative facial recognition system 100, in accordance with various embodiments of the present disclosure. In embodiments, facial recognition system 100 may include a facial feature extraction module 102, a facial registration module 114 coupled with facial feature extraction module 102, a facial recognition module 118 also coupled with facial extraction module 102, and storage 116 that may be coupled with both facial registration module 114 and facial recognition module 118. In some embodiments, each of these components of facial recognition system 100 may be disposed on the same computing device. In other embodiments, one or more of the components may reside on separate computing devices. In embodiments, where two or more of the components of facial recognition system reside on separate computing devices, the components may be communicatively coupled by way of a wired network, a wireless network, or any combination thereof.

In embodiments, facial feature extraction module 102 may be configured to receive reference images 104 and operational images 108. As used herein "images" will collectively refer to both reference images 104 and operational images 108, unless the context indicates otherwise. The reference images 104 and operational images 108 may have faces of persons included therein. In embodiments, facial feature extraction module 102 may also receive corresponding identifiers (e.g., ID 106) associated with the persons whose faces may be included in the reference images.

Facial feature extraction module 102 may receive reference images 104 and operational images 106 in any number of ways. For example, facial recognition system 100 may include one or more cameras that may capture such images and facial feature extraction module 102 may receive these images directly from the one or more cameras, or from a software application that may be operatively coupled with the one or more cameras. In other embodiments, such images may be received from one or more remote devices that may be communicatively coupled with facial recognition system 100 by way of a wired network, wireless network, or any combination thereof. In addition, these images may include a single face or multiple faces. In embodiments, where these images may include multiple faces, each face included in the image may be processed iteratively by facial recognition system 100.

Facial feature extraction module 102 may be configured to perform gradient based feature extraction of the faces and may utilize the results of the gradient based feature extraction in determining directional matching patterns of the faces within reference images 104 and operational images 108. Facial feature extraction module 102 may be further configured to generate facial feature vectors that represent these directional matching patterns of the faces and may output reference facial feature vectors 110 along with the corresponding identifiers to facial registration module, and test facial feature vectors 112 to facial recognition module 118.

In some embodiments, facial feature extraction module 102 may be configured to perform pre-processing actions prior to initiating the gradient based feature extraction. In embodiments, these pre-processing actions may include identifying, or determining, a rectangle that encloses the face in the image. This may be accomplished through any conventional facial detection process. In further embodiments, the facial feature extraction module may also normalize the face prior to performing the gradient based feature extraction. In such a normalization, facial feature extraction module 102 may rotate the image, or the face alone, to vertically align the face; may resize the image, or the face alone, to enlarge the face; and/or may perform any number of additional normalizing actions to normalize the face for the gradient based feature extraction. In some embodiments, left and right reference locations may be defined that correlate with a desired location of the left and right eyes, respectively (e.g., reference locations 512 and 514 discussed below in reference to FIG. 5). In such embodiments, the normalization may cause the eyes of the face to relocate to the respective reference locations. This may be accomplished, at least in part, utilizing any conventional eye detector to detect the locations of the eyes in the image and then calculating movements and/or resizing the image to result in the relocation of the eyes to the respective reference locations.

In embodiments, facial feature extraction module 102 may be configured to perform a gradient based feature extraction on the faces within the images. The extracted gradient based features may then be utilized in determining local directional matching patterns within the images of the faces. This may be accomplished, at least in part, utilizing a histogram of oriented gradients (HOG) analysis of the image, a scale invariant feature transformation (SIFT) analysis, or any other gradient based feature analysis. From the gradient based feature extraction, facial feature extraction module 102 may generate facial feature vectors that represent the directional matching patterns of the faces within the images. In some embodiments, the images may be discarded at this point in the processing and any further processing, for example by facial registration module or facial recognition module, may be performed solely on the facial feature vectors. In other embodiments the images may be persisted in the event additional processing may be required of the image (e.g., in the event of a change in the gradient based feature extraction process being utilized).

Facial registration module 114 may be configured to store the facial feature vectors generated from reference images 104 as reference facial feature vectors 110 in storage 116. Facial registration module 114 may also associate the corresponding identifier with the reference facial feature vector in storage 116. In embodiments, storage 116 may be, for example, a database located either locally or remotely that may be communicatively coupled with facial registration module 114 and/or facial recognition module 118.

As can be seen, facial recognition module 118 may be coupled with facial feature extraction module 102 and storage 116. In embodiments, facial recognition module 118 may be configured to perform a facial recognition analysis on the faces of the operational images utilizing the facial feature vectors, generated from the operational images, as test facial feature vectors 112. This may be accomplished by comparing test facial feature vectors against reference facial feature vectors. In such a comparison, a test facial feature vector that is within a predefined threshold of similarity to a reference facial feature vector may be identified as the person associated with the reference facial feature vector.

In embodiments, facial recognition module 118 may be configured to retrieve a reference facial feature vector associated with an identifier of a person from storage 116. Facial recognition module may then analyze the reference facial feature vector against a test facial feature vector of an operational image to determine a level of similarity between the directional matching patterns represented by the reference facial feature vector and the directional matching patterns represented by the test facial feature vector. In embodiments, the facial recognition module may identify the face of the operational image as the person associated with the identifier if the level of similarity between the directional matching patterns represented by the reference facial feature vector and the directional matching patterns represented by the test facial feature vector is above a threshold of similarity.

In some embodiments, facial recognition module 118 may be configured to analyze the reference facial feature vector against the test facial feature vector by generating a directional histogram based upon portions of the test facial feature vector that are substantially similar to a corresponding portion of the reference facial feature vector under comparison.

As used herein, substantially similar may mean that two items (e.g., faces, feature vectors, etc.) are above a predefined threshold of similarity to one another. The directional histogram for each of these portions may be concatenated together to generate a histogram of local matching directions for the test image based on those portions of the test facial feature vector that are substantially similar to a corresponding portion of the reference facial feature vector. The histogram of local matching directions may then be analyzed to determine whether the test facial feature vector indicates that the person in the test image is the same person in the reference image. Such an analysis may be accomplished, for example, utilizing a binary classification system, such as, for example, a support vector machine (SVM) classification system.

In some embodiments, if facial recognition module 118 determines that the face of the test image is substantially similar to that of a reference image, utilizing the comparison discussed above, facial recognition module 118 may authenticate the person in the test image as the same person in the reference image. Such an authentication may be to a user of facial recognition system 100 or may be to an application that has requested such an authentication. If facial recognition module 118 determines that the face of test image is not substantially similar to a reference image, utilizing the comparison discussed above, then facial recognition module 118 may iterate through any additional reference facial feature vectors and may perform a same or similar process to that described above with respect to the additional reference facial feature vectors.

Figure 2:
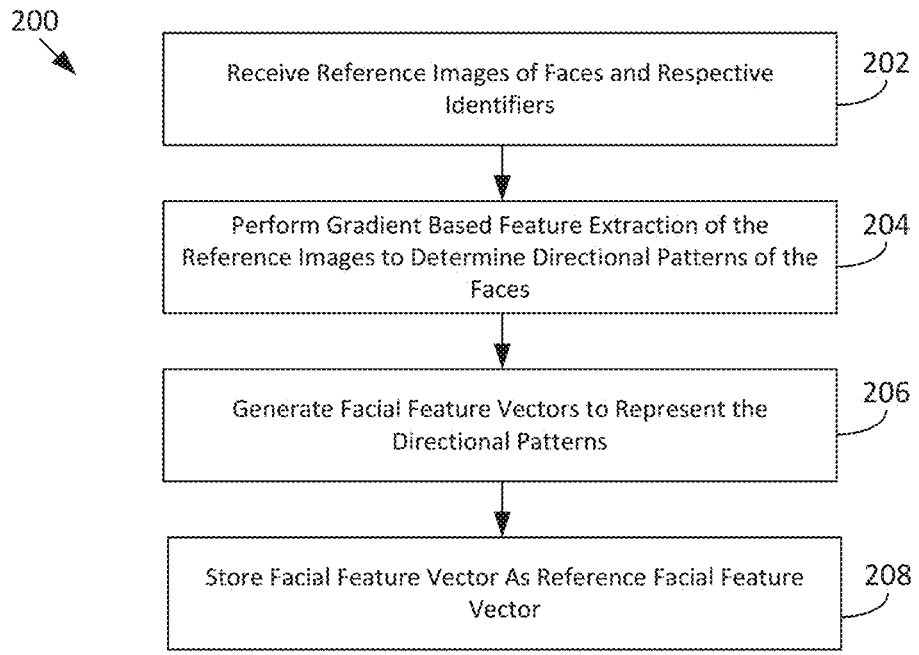
FIG. 2 illustrates an example process flow for facial registration, in accordance with various embodiments of the present disclosure.

FIG. 2 illustrates an example process flow for facial registration, in accordance with various embodiments of the present disclosure. In embodiments, such a process flow may be carried out, for example, by a computing device having facial feature extraction module 102 and facial registration module 114 of FIG. 1 integrated therewith.

The process flow may begin at block 202 where the computing device may receive reference images of faces of persons (e.g., reference images 104 of FIG. 1) along with respective identifiers of the persons (e.g., ID 106). These reference images may be received in any number of ways such as those discussed above in reference to FIG. 1. These reference images may include a single face or multiple faces. In embodiments where multiple persons' faces are included in a single reference image, corresponding multiple identifiers may be received in a manner in which the identifiers may be mapped to the respective persons to which the faces belong. For example, the identifiers could be included in an array ordered to correspond with the persons from left to right in image. In embodiments where a single reference image may include multiple faces, each face included in the reference image may be processed iteratively as described herein.

At block 204, the computing device may perform a gradient based feature extraction of the reference images to determine directional matching patterns of the faces within the reference images. As discussed above in reference to FIG. 1, in some embodiments, this process may include performing pre-processing actions prior to initiating the gradient based feature extraction. In embodiments, these pre-processing actions may include identifying, or determining, a rectangle that encloses the face in the image, which may be accomplished through any conventional facial detection process. In further embodiments such pre-processing actions may include normalizing the face prior to performing the gradient based feature extraction. Such a normalizing process may include rotating the image, or the face alone, to vertically align the face; resizing the image, or the face alone, to enlarge the face; and/or performing any number of additional normalizing actions to normalize the face for the gradient based feature extraction. In some embodiments, left and right reference locations may be defined that correlate with a desired location of the left and right eyes, respectively (e.g., reference locations 512 and 514 discussed below in reference to FIG. 5). In such embodiments, the normalizing process may cause the eyes of the face to relocate to the respective reference locations. This may be accomplished, at least in part, utilizing any conventional eye detector to detect the locations of the eyes in the reference image. Once the eyes have been located the process may proceed by calculating movements and/or resizing the image to result in the relocation of the eyes to the respective reference locations.

In embodiments, the gradient based features may be utilized to determine local directional matching patterns within the faces of the reference images. This may be accomplished, at least in part, utilizing a histogram of oriented gradients (HOG) analysis of the image, a scale invariant feature transformation (SIFT) analysis, or any other gradient based feature analysis. From the gradient based feature extraction, facial feature vectors may be generated by the computing device at block 206. The facial feature vectors may represent the directional matching patterns of the faces within the reference images. At block 208 the computing device may store the facial feature vectors of the reference images as reference facial feature vectors and may associate the reference facial feature vectors with the corresponding identifiers of the persons.

Figure 3:
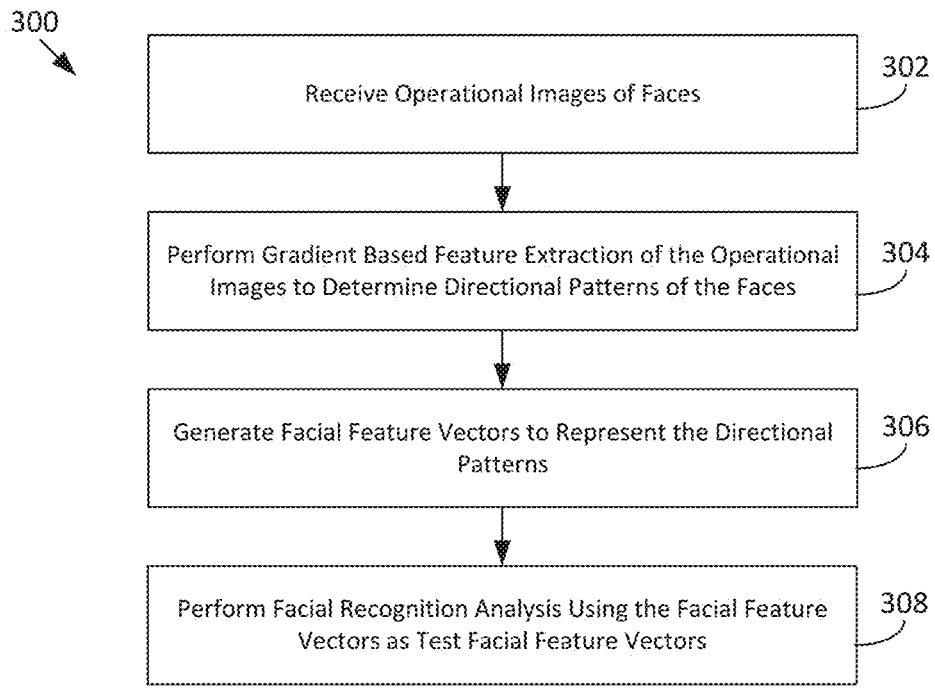
FIG. 3 illustrates an example process flow for facial recognition, in accordance with various embodiments of the present disclosure.

FIG. 3 illustrates an example process flow for facial recognition, in accordance with various embodiments of the present disclosure. In embodiments, such a process flow may be carried out, for example, by a computing device having facial feature extraction module 102 and facial recognition module 116 of FIG. 1 integrated therewith.

The process flow may begin at block 302 where the computing device may receive operational images of faces of persons (e.g., operational images 108 of FIG. 1). These operational images may be received by the computing device in any number of ways, such as those discussed above in reference to FIG. 1. These operational images may include a single face or multiple faces. In embodiments where a single operational image may include multiple faces, each face included in the operational image may be processed iteratively by the computing device as described herein.

At block 304, the computing device may perform a gradient based feature extraction of the operational images to determine directional matching patterns of the faces within the operational images. As discussed above in reference to FIG. 1, and as with the reference images discussed in reference to FIG. 2, above, in some embodiments, this process may include performing pre-processing actions by the computing device prior to initiating the gradient based feature extraction. In embodiments, these pre-processing actions may include identifying, or determining, a rectangle that encloses the face in the image, which may be accomplished through any conventional facial detection process. In further embodiments such pre-processing actions may include normalizing the face prior to performing the gradient based feature extraction. Such a normalizing process may include rotating the image, or the face alone, to vertically align the face; resizing the image, or the face alone, to enlarge the face; and/or performing any number of additional normalizing actions to normalize the face for the gradient based feature extraction. In some embodiments, left and right reference locations may be defined that correlate with a desired location of the left and right eyes, respectively (e.g., reference locations 512 and 514 discussed below in reference to FIG. 5). In such embodiments, the normalizing process may cause the eyes of the face to relocate to the respective reference locations. This may be accomplished, at least in part, utilizing any conventional eye detector to detect the locations of the eyes in the operational images. Once the eyes have been located the process may proceed by the computing device calculating movements and/or resizing the image resulting in the relocation of the eyes to the respective reference locations.

In embodiments, the gradient based features may be extracted from the operational images to determine local directional matching patterns within the faces of the operational images. This may be accomplished, at least in part, utilizing a histogram of oriented gradients (HOG) analysis of the image, a scale invariant feature transformation (SIFT) analysis, or any other gradient based feature analysis. From the gradient based feature extraction, the computing device may generate facial feature vectors, at block 306, that represent the directional matching patterns of the faces within the operational images.

At block 308 the computing device may perform facial recognition analysis using the facial feature vectors of the operational images as test facial feature vectors. This may be accomplished by comparing test facial feature vectors against reference facial feature vectors. In such a comparison, a test facial feature vector that is within a predefined threshold of similarity to a reference facial feature vector may be identified as the person associated with the reference facial feature vector.

In embodiments, such a facial recognition analysis may begin by retrieving a reference facial feature vector associated with an identifier of a person from a repository (e.g., storage 116 of FIG. 1). The reference facial feature vector may then be analyzed by the computing device against a test facial feature vector of an operational image to determine a level of similarity between the directional matching patterns represented by the reference facial feature vector and the directional matching patterns represented by the test facial feature vector. In embodiments, the facial recognition module may identify the face of the operational image as the person associated with the identifier if the level of similarity between the directional matching patterns represented by the reference facial feature vector and the directional matching patterns represented by the test facial feature vector is above a threshold of similarity.

Figure 6:
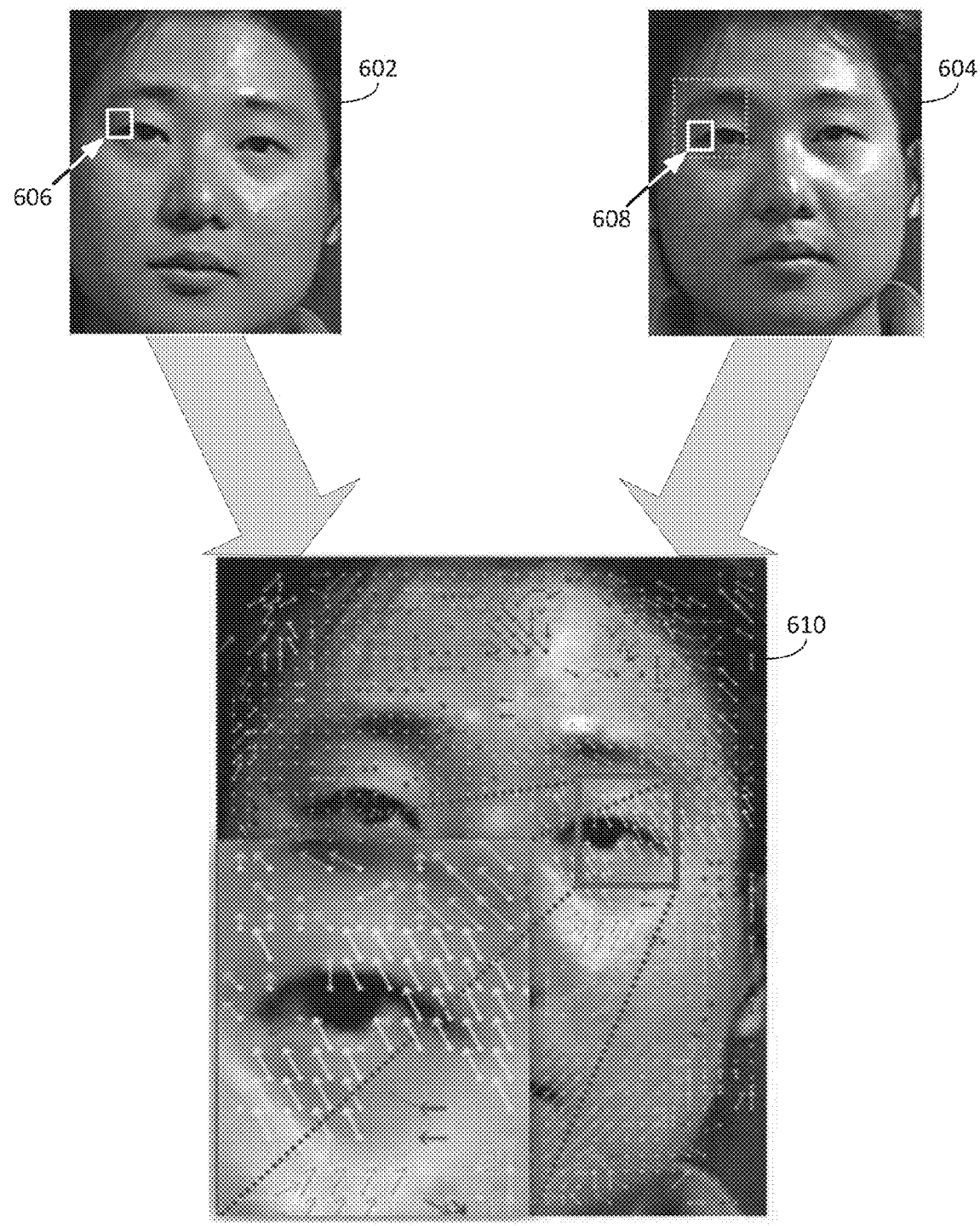
FIG. 6 illustrates a portion of an example facial recognition process, in accordance with various embodiments of the present disclosure.
Figure 7:
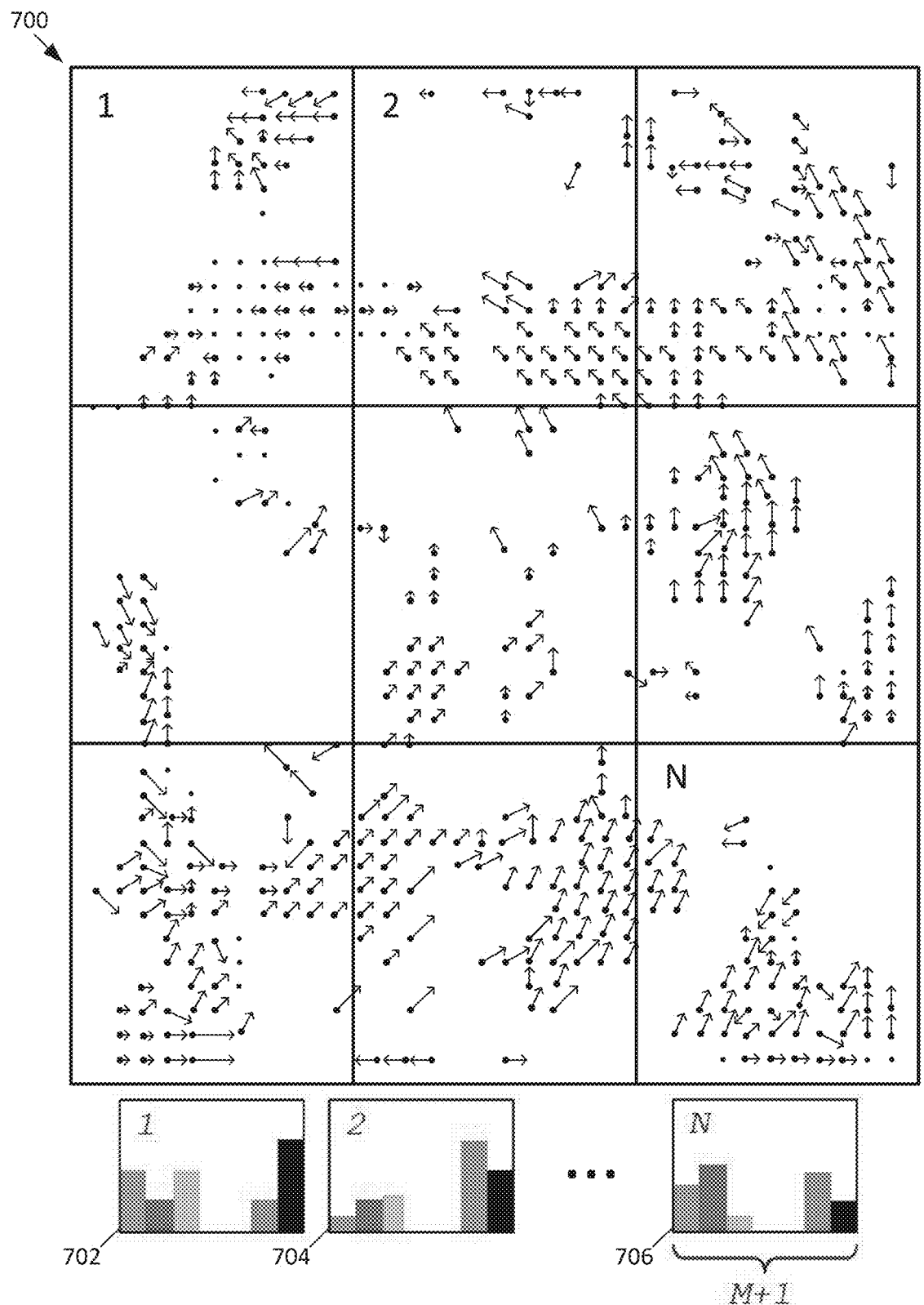
FIG. 7 illustrates an example histogram analysis of a facial recognition process, in accordance with various embodiments of the present disclosure.

In some embodiments, the facial recognition analysis may be accomplished by generating a directional histogram based upon portions of the test facial feature vector that are substantially similar to corresponding portions of the reference facial feature vector under comparison. The directional histogram for each of these portions may be concatenated together to generate a histogram of local matching directions for the test image based on those portions of the test facial feature vector that are substantially similar to corresponding portions of the reference facial feature vector. The histogram of local matching directions may then be analyzed to determine whether the test facial feature vector indicates that the person in the test image is the same person in the reference image. Such an analysis is depicted by FIGS. 6 and 7, discussed below, and may be accomplished, for example, utilizing a binary classification system, such as, a support vector machine (SVM) classification system.

Figure 4:
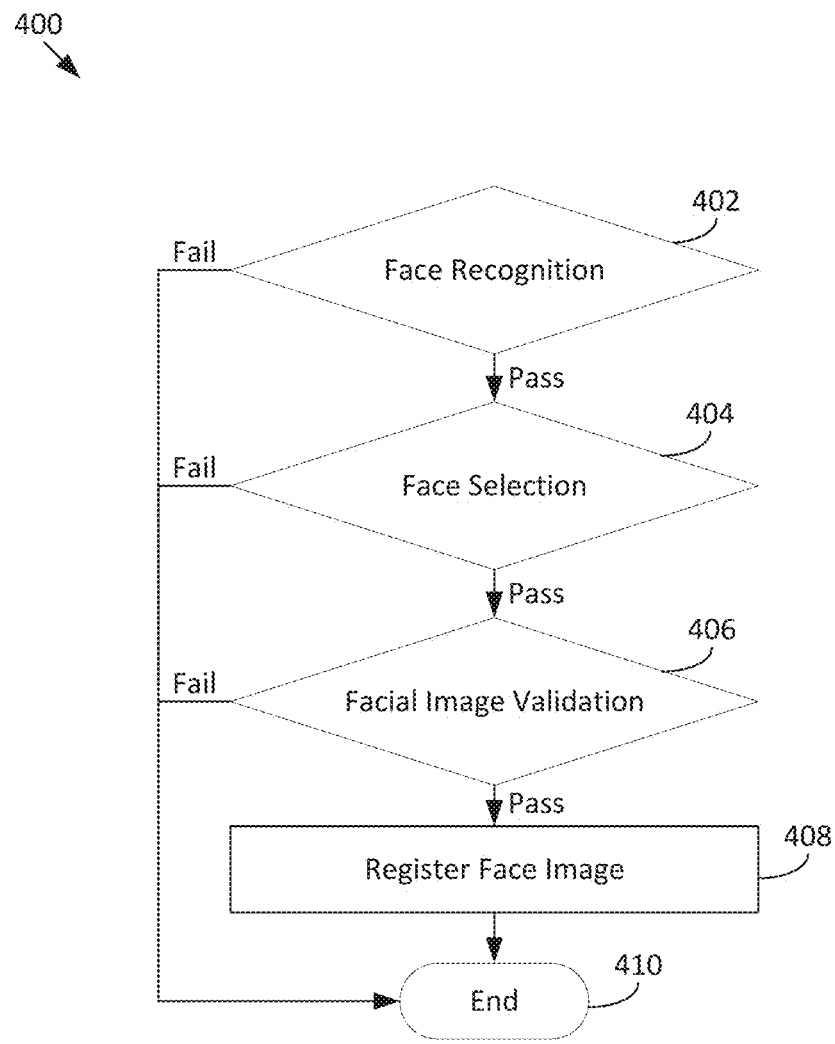
FIG. 4 illustrates an example process flow for automatic registration of operational images as reference images, in accordance with various embodiments of the present disclosure.

FIG. 4 illustrates an example process flow for automatic registration of multiple reference images in a gallery of references images of a person from operational images of the person, in accordance with various embodiments of the present disclosure. As used herein, automatic may refer to actions that require no human interaction, and may be synonymous with autonomous. Such a process may be carried out, for example, by a computing device that has a facial recognition system, such as facial recognition system 100, or any portion thereof, disposed thereon. In embodiments, the process may begin at block 402 where a facial recognition process may be performed on an operational image to positively identify a person in the operational image. In the event that a positive identification of the person in the operational image is accomplished, either through the procedures described above, or any other facial recognition process, the process may proceed to block 404.

At block 404 a face selection analysis may be performed by the computing device on the operational image. In an effort not to register operational images of faces that are overly similar, this process may include a determination of a level of similarity between the operational image and current images registered for the person in the operational images. In embodiments, this may be accomplished utilizing a test facial feature vector of the operational image and reference facial feature vectors of the images in the gallery of reference images. If the level of similarity between the operational image and any of the already registered images is too high, the face selection process may fail and the process may proceed to block 410 where the process may end. If however, the face is has been positively identified by face recognition at block 402 as the person, and the image of the face is sufficiently different from those images that are already registered to the person, then the process may proceed to block 406.

At block 406 the image of the face may be validated. The validation of the facial image may include an analysis of the quality of the image of the face. Such an analysis may include determining a distance between eyes of the face in the image to determine if the face is a proper size to be registered. This analysis may also include a determination of the alignment of the face in the image to ensure that the face is not overly tilted. This analysis may further include a determination of the frontality of the face in the image to ensure that the face in the image is oriented in a forward facing position. If the validation of the facial image fails, the process may proceed to block 410 where the process may end. If, however, the facial image validation passes, the process may proceed to block 408 where the operational image may be added to the gallery of reference images of the person. Such a process may enable images of a person having various facial expressions, illumination conditions, facial poses and so forth to be registered to the person to provide for such variations in a facial recognition process.

Figure 5:
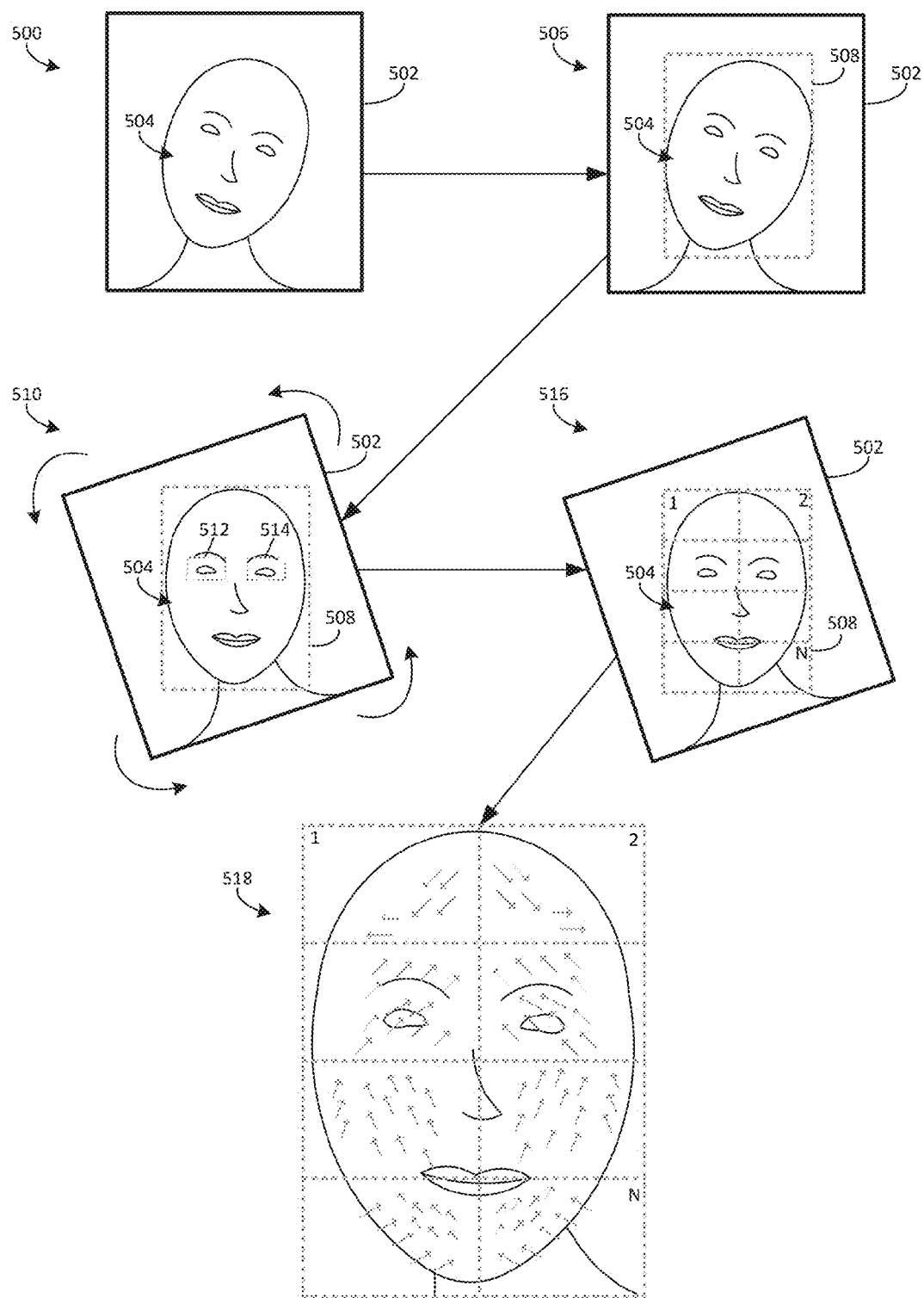
FIG. 5 illustrates an example feature extraction process, in accordance with various embodiments of the present disclosure.

FIG. 5 depicts an example operational flow of a feature extraction process, in accordance with various embodiments of the present disclosure. The process may begin at 500 where an image 502 including a face 504 may be received. At 506 a rectangle 508 that encloses the face may be identified. The may be accomplished by any conventional facial identification process. In some embodiments, a position of the left eye of the face and a position of the right eye of the face may also be detected in any conventional eye detection process.

At block 510, the face may undergo a normalization process to cause the left eye of the face to relocate to a first reference position 514 and the right eye to relocate to a second reference position 512. In embodiments, normalizing may include rotating the image, as depicted, to align the face vertically or resizing the image to enlarge the face.

At 516 the rectangle that encloses the face may be divided into a plurality of portions to form a grid of portions 1-N over the face. At 518 gradient based features may be extracted from each portion of the grid to determine directional matching patterns within the grids, such as the directional matching patterns depicted at 518. In embodiments each portion of the grid may be represented by a facial feature vector of the image.

As discussed above, in some embodiments, such a gradient based feature extraction may be performed via a histogram of oriented gradients (HOG) analysis of each portion of the plurality of portions of the image. In other embodiments, such a gradient based feature extraction may be performed via scale invariant feature transformation (SIFT) analysis of each portion of the plurality of portions of the image.

FIG. 6 illustrates a portion of an example facial recognition process, such as that discussed in reference to FIGS. 1 and 3-5, in accordance with various embodiments of the present disclosure. In embodiments, a reference facial feature vector of a reference image (e.g., reference image 602) may be compared against a test facial feature vector of an operational image (e.g., operational image 604). This may be accomplished by identifying portions of the test facial feature vector of the operational image that are substantially similar to a corresponding portion of the reference facial feature vector of the reference image under comparison (e.g., portion 606 of the reference image and portion 608 of the operational image. A flow vector may then be defined for each of these portions, depicted by the flow vector overlayed on the reference image at 610. Each arrow in the flow vector may correspond with a point of similarity between the reference facial feature vector of reference image 602 and the test facial feature vector of test image 604. A portion of the flow vector is enlarged to show additional detail. As can be seen, there are some areas of the image that do not include directional arrows. Such areas may correspond with areas between the reference facial feature vector of reference image 602 and the test facial feature vector of test image 604 that were determined to not be sufficiently similar. A more refined version of such a flow vector is depicted in FIG. 7, along with corresponding histograms of local matching directions.

FIG. 7 illustrates an example flow vector 700 and corresponding directional histograms 702-706, in accordance with various embodiments of the present disclosure. As depicted, flow vector 700 may be generated as discussed above in reference to FIG. 6 by identifying one or more portions of test facial feature vector that have directional matching patterns similar to the corresponding portion of the reference facial feature vector. For each portion 1-N of the flow vector a corresponding directional histogram may be generated by binning arrows of the same direction from each portion. These directional histograms may then be concatenated together to generate a histogram of local matching directions for the test image as compared with the reference image. As depicted, N may represent the number of portions that the test facial feature vector is divided into, and M may represent the number of bins of the histogram (+1 for recording unmatched portions). In some embodiments, a face in an operational image may be identified as that of a person in a reference image utilizing a binary classification system, such as that discussed above, applied to the histogram of local matching directions.

Figure 8:
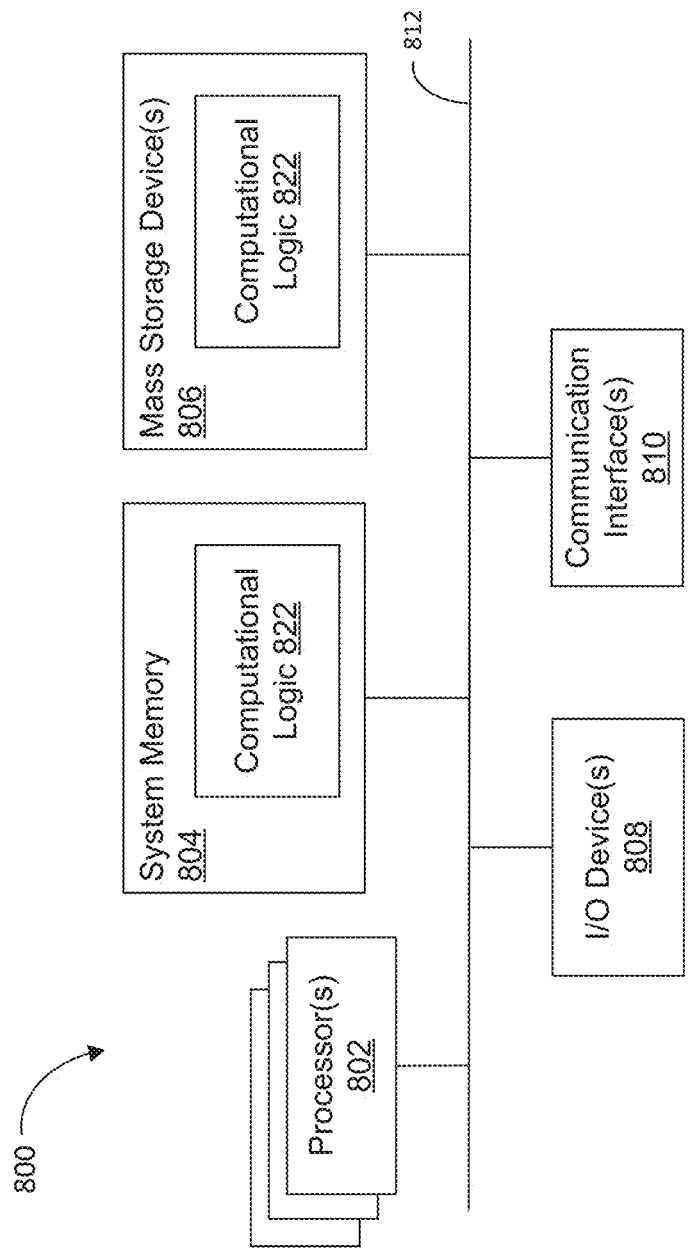
FIG. 8 is a schematic illustration of an example computing device, in accordance with various embodiments of the present disclosure.

Referring now to FIG. 8, wherein an example computing device suitable to implement a facial recognition system 100, in accordance with various embodiments, is illustrated. As shown, computing device 800 may include one or more processors or processor cores 802, and system memory 804. In embodiments, multiple processor cores 802 may be disposed on one die. For the purpose of this application, including the claims, the terms "processor" and "processor cores" may be considered synonymous, unless the context clearly requires otherwise. Additionally, computing device 800 may include mass storage device(s) 806 (such as diskette, hard drive, compact disc read-only memory (CD-ROM), and so forth), input/output (I/O) device(s) 808 (such as camera, display device, keyboard, cursor control, gyroscope, accelerometer, and so forth), and communication interfaces 810 (such as network interface cards, modems, and so forth). In embodiments, a display device may be touch screen sensitive and may include a display screen, one or more processors, storage medium, and communication elements. Further, it may be removably docked or undocked from a base platform having the keyboard. The elements may be coupled to each other via system bus 812, which may represent one or more buses. In the case of multiple buses, they may be bridged by one or more bus bridges (not shown).

Each of these elements may perform its conventional functions known in the art. In particular, system memory 804 and mass storage device(s) 806 may be employed to store a working copy and a permanent copy of programming instructions implementing the operations described earlier, e.g., but not limited to, operations associated with facial feature extraction module 102, facial registration module 114, and/or face recognition module 110. The various operations may be implemented by assembler instructions supported by processor(s) 802 or high-level languages, such as, for example, C, that may be compiled into such instructions.

The permanent copy of the programming instructions may be placed into permanent mass storage device(s) 806 in the factory, or in the field, through, for example, a distribution medium (not shown), such as a compact disc (CD), or through communication interface 810 (from a distribution server (not shown)). That is, one or more distribution media having an implementation of facial feature extraction module 102, facial registration module 114, and/or face recognition module 110 may be employed to distribute these components to various computing devices.

The number, capability, and/or capacity of these elements 810-812 may vary, depending on the intended use of example computing device 800, e.g., whether example computer 800 is a smartphone, tablet, ultrabook, laptop, or desktop. The constitutions of these elements 810-812 are otherwise known, and accordingly will not be further described. While the face recognition techniques of the present disclosure are designed to enable efficient face recognition on computing devices with relatively limited computing resources, such as wearable devices, smartphones or other mobile devices, the face recognition techniques may be practiced on computing devices with relatively more abundant computing resources, such as desktop computers, servers, and so forth.

Figure 9:
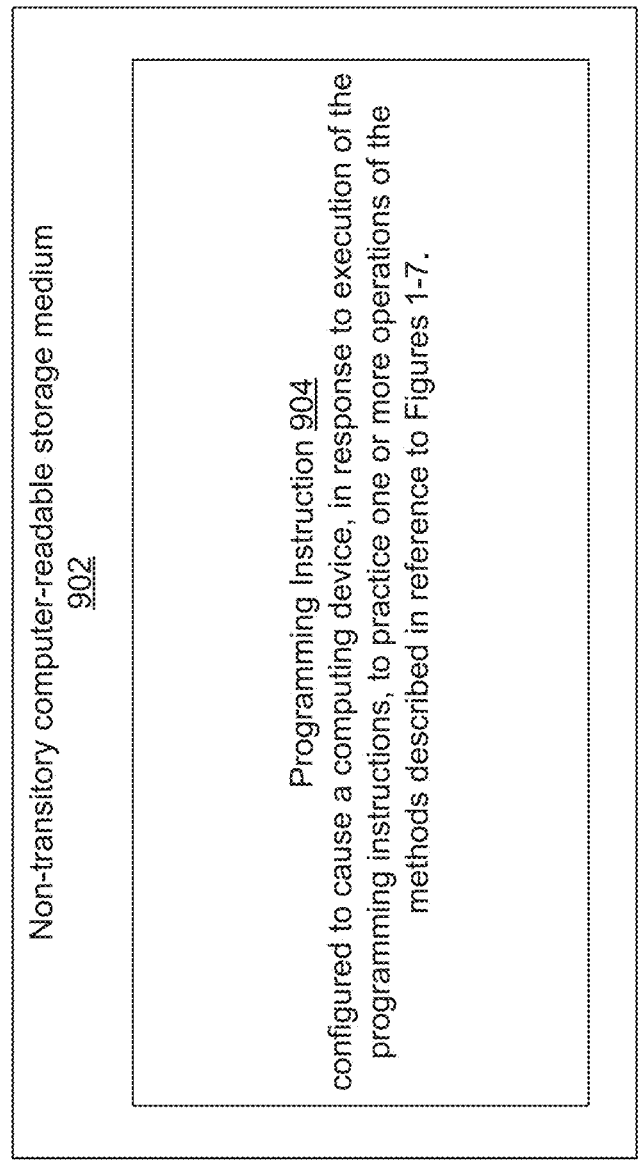
FIG. 9 illustrates an example non-transitory computer-readable storage medium having instructions configured to practice all or selected ones of the operations associated with the processes described above.

FIG. 9 illustrates an example non-transitory computer-readable storage medium having instructions configured to practice all or selected ones of the operations associated with the processes described above. As illustrated, non-transitory computer-readable storage medium 902 may include a number of programming instructions 904. Programming instructions 904 may be configured to enable a device, e.g., computing device 800, in response to execution of the programming instructions, to perform one or more operations of the processes described in reference to FIGS. 1-7. In alternate embodiments, programming instructions 904 may be disposed on multiple non-transitory computer-readable storage media 902 instead. In still other embodiments, programming instructions 904 may be encoded in transitory computer-readable signals.

Referring back to FIG. 8, for one embodiment, at least one of processors 802 may be packaged together with memory having computational logic 822 (in lieu of storing in memory 804 and/or mass storage 806) configured to perform one or more operations of the processes described with reference to FIGS. 1-7. For one embodiment, at least one of processors 802 may be packaged together with memory having computational logic 822 configured to practice aspects of the methods described in reference to FIGS. 1-7 to form a System in Package (SiP). For one embodiment, at least one of processors 802 may be integrated on the same die with memory having computational logic 822 configured to perform one or more operations of the processes described in reference to FIGS. 1-7. For one embodiment, at least one of processors 802 may be packaged together with memory having computational logic 822 configured to perform one or more operations of the process described in reference to FIGS. 1-7 to form a System on Chip (SoC). Such an SoC may be utilized in any suitable computing device.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

Embodiments of the disclosure can take the form of an entirely hardware embodiment, an entirely software embodiment or an embodiment containing both hardware and software elements. In various embodiments, software, may include, but is not limited to, firmware, resident software, microcode, and the like. Furthermore, the disclosure can take the form of a computer program product accessible from a computer-usable or computer-readable medium providing program code for use by or in connection with a computer or any instruction execution system. As used herein, module may refer to a software module, a hardware module, or any number or combination thereof.

As used herein, the term module includes logic that may be implemented in a hardware component or device, software or firmware that may be run or running on a processor, or a combination of processors. The modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures.

For the purposes of this description, a computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

EXAMPLES

Some non-limiting examples are: Example 1 may include an apparatus for computing, comprising: a facial feature extraction module to: receive operational and reference images having faces, the reference images having corresponding identifiers of persons; perform gradient based feature extraction of the faces to determine directional matching patterns of the faces; and generate facial feature vectors that represent the directional matching patterns of the faces; a facial registration module coupled with the facial feature extraction module to: store the facial feature vectors of the reference images as reference facial feature vectors associated with the corresponding identifiers of the persons; and a facial recognition module, coupled with the facial feature extraction module, the facial recognition module to: perform facial recognition analysis on the faces of the operational images utilizing the facial feature vectors generated from the operational images as test facial feature vectors in comparison with the reference facial feature vectors to identify the faces in the operational images.

Example 2 may include the subject matter of Example 1, wherein the facial feature extraction module is to perform a gradient based feature extraction of a face via: identification of a rectangle that encloses the face; detection of a first position of a left eye of the face within the rectangle and a second position of a right eye of the face within the rectangle; and normalization of the face to cause the left eye to relocate from the first position to a first reference position and the right eye to relocate from the second position to a second reference position.

Example 3 may include the subject matter of Example 2, wherein the facial feature extraction module, as part of normalization of the face, rotates the image to align the face vertically or resizes the image to enlarge the face.

Example 4 may include the subject matter of either of Examples 2 or 3, wherein the facial feature extraction module, as part of the performance of the gradient based feature extractions, is further to: divide the rectangle that encloses the face into a plurality of portions to form a grid over the face; and extract gradient based features from each portion of the grid to determine directional matching patterns within the grid, wherein the directional matching patterns of each portion of the grid are represented by the facial feature vector of the face.

Example 5 may include the subject matter of Example 4, wherein the facial feature extraction module, as part of the extraction of gradient based features of the plurality of portions, is to perform a histogram of oriented gradients (HOG) analysis of each portion of the plurality of portions of the image, or perform scale invariant feature transformation (SIFT) analysis of each portion of the plurality of portions of the image.

Example 6 may include the subject matter of either of Examples 4 or 5, wherein the facial recognition module, as part of the facial recognition analysis, is to: retrieve a reference facial feature vector associated with an identifier of a person; analyze the reference facial feature vector against a test facial feature vector of an operational image to determine a level of similarity between the directional matching patterns represented by the reference facial feature vector and the directional matching patterns represented by the test facial feature vector; and identify the face of the image as the person associated with the identifier, in response to determination that the level of similarity between the directional matching patterns represented by the reference facial feature vector and the directional matching patterns represented by the test facial feature vector is above a threshold of similarity.

Example 7 may include the subject matter of Example 6, wherein the facial recognition module, as part of the facial recognition analysis is further to: compare each portion of the grid with a corresponding portion of the reference facial feature vector; identify one or more portions of the grid that have directional matching patterns similar to the corresponding portion of the reference facial feature vector; generate a directional histogram for each portion of the one or more portions of the grid; and concatenate each directional histogram generated into a histogram of local matching directions for the image.

Example 8 may include the subject matter of Example 7, wherein the facial recognition module, as part of the facial recognition analysis is to further identify the face of the image as that of the person associated with the identifier of the reference facial feature vector, utilizing a binary classification system applied to the histogram of local matching directions.

Example 9 may include the subject matter of any one of Examples 1-8, wherein the facial recognition module is further to: determine that a level of similarity between a test facial feature vector of an operational image of and a reference facial feature vector of a reference image is above a predefined threshold of similarity; and add the operational image of a person to a gallery of images of the person, based on the determination.

Example 10 may include the subject matter of Example 9, wherein the predefined threshold of similarity is a first predefined threshold of similarity, and wherein to determine that the level of similarity is above the first predefined threshold of similarity further includes determination that the level of similarity if below a second predefined threshold similarity.

Example 11 may include the subject matter of either of Examples 9 or 10, wherein to add the operational image to the gallery of images is further based on one or more of: a distance between eyes of the face in the image; alignment of the face in the image; or frontality of the face in the image.

Example 12 may include a computer-implemented method for facial recognition comprising: receiving, by a computing device, reference images having faces and corresponding identifiers of persons; performing, by the computing device, gradient based feature extraction of the faces to determine directional matching patterns of the faces; generating, by the computing device, facial feature vectors that represent the directional matching patterns of the faces; and storing, by the computing device, the facial feature vectors of the reference images as reference facial feature vectors associated with the corresponding identifiers of the persons.

Example 13 may include the subject matter of Example 12, further comprising: receiving, by the computing device, operational images having faces; performing, by the computing device, gradient based feature extraction of the faces of the operational images, to determine directional matching patterns of the faces of the operational images; generating, by the computing device, facial feature vectors that represent the directional matching patterns of the faces of the operational images; and performing, by the computing device, facial recognition analysis on the faces of the operational images utilizing the facial feature vectors generated from the operational images as test facial feature vectors in comparison with the reference facial feature vectors to identify the faces in the operational images.

Example 14 may include the subject matter of Example 13, wherein performing the gradient based feature extraction of a face further comprises: identifying, by the computing device, a rectangle that encloses the face; detecting, by the computing device, a first position of a left eye of the face within the rectangle and a second position of a right eye of the face within the rectangle; and normalizing, by the computing device, the face to cause the left eye to relocate from the first position to a first reference position and the right eye to relocate from the second position to a second reference position dividing the rectangle that encloses the face into a plurality of portions to form a grid over the face; and extracting gradient based features from each portion of the grid to determine directional matching patterns within the grid, wherein the directional matching patterns of each portion of the grid are represented by the facial feature vector of the face.

Example 15 may include the subject matter of Example 14, wherein extracting gradient based features of the plurality of portions, includes performing a histogram of oriented gradients (HOG) analysis of each portion of the plurality of portions of the image, or performing scale invariant feature transformation (SIFT) analysis of each portion of the plurality of portions of the image.

Example 16 may include the subject matter of either of Examples 14 or 15, wherein performing facial recognition analysis, further comprises: retrieving a reference facial feature vector associated with an identifier of a person; analyzing the reference facial feature vector against a test facial feature vector of an operational image to determine a level of similarity between the directional matching patterns represented by the reference facial feature vector and the directional matching patterns represented by the test facial feature vector; and identifying the face of the image as the person associated with the identifier, in response to determining that the level of similarity between the directional matching patterns represented by the reference facial feature vector and the directional matching patterns represented by the test facial feature vector is above a threshold of similarity.

Example 17 may include the subject matter of Example 16, wherein performing the facial recognition analysis further comprises: comparing each portion of the grid with a corresponding portion of the reference facial feature vector; identifying one or more portions of the grid that have directional matching patterns similar to the corresponding portion of the reference facial feature vector; generating a directional histogram for each portion of the one or more portions of the grid; and concatenating each directional histogram generated into a histogram of local matching directions for the image.

Example 18 may include the subject matter of Example 17, wherein performing facial recognition analysis further comprises identifying the face of the image as that of the person associated with the identifier of the reference facial feature vector, utilizing a binary classification system applied to the histogram of local matching directions.

Example 19 may include one or more computer-readable media having a plurality of instructions stored thereon, the instructions, in response to execution by a processor, to cause the processor to: receive operational images having faces; perform gradient based feature extraction of the faces of the operational images, to determine directional matching patterns of the faces of the operational images; generate facial feature vectors that represent the directional matching patterns of the faces of the operational images; and perform facial recognition analysis on the faces of the operational images utilizing the facial feature vectors generated from the operational images as test facial feature vectors in comparison with reference facial feature vectors to identify the faces in the operational images.

Example 20 may include the subject matter of Example 19, wherein the instructions, in response to execution by a processor, further cause the processor to: receive reference images having faces and corresponding identifiers of persons; perform gradient based feature extraction of the faces to determine directional matching patterns of the faces; generate facial feature vectors that represent the directional matching patterns of the faces; and store the facial feature vectors of the reference images as reference facial feature vectors associated with the corresponding identifiers of the persons.

Example 21 may include the subject matter of Example 20, wherein to perform the gradient based feature extraction of a face further comprises: identification of a rectangle that encloses the face; detection of a first position of a left eye of the face within the rectangle and a second position of a right eye of the face within the rectangle; normalization of the face to cause the left eye to relocate from the first position to a first reference position and the right eye to relocate from the second position to a second reference position; division of the rectangle that encloses the face into a plurality of portions to form a grid over the face; and extraction of gradient based features from each portion of the grid to determine directional matching patterns within the grid, wherein the directional matching patterns of each portion of the grid are represented by the facial feature vector of the face.

Example 22 may include the subject matter of Example 21, wherein extraction of gradient based features of the plurality of portions, includes performance of a histogram of oriented gradients (HOG) analysis of each portion of the plurality of portions of the image, or performance of a scale invariant feature transformation (SIFT) analysis of each portion of the plurality of portions of the image.

Example 23 may include the subject matter of either of Examples 21 or 22, wherein to perform facial recognition analysis, further comprises: retrieval of a reference facial feature vector associated with an identifier of a person; analysis of the reference facial feature vector against a test facial feature vector of an operational image to determine a level of similarity between the directional matching patterns represented by the reference facial feature vector and the directional matching patterns represented by the test facial feature vector; and identification of the face of the image as the person associated with the identifier, in response to a determination that the level of similarity between the directional matching patterns represented by the reference facial feature vector and the directional matching patterns represented by the test facial feature vector is above a threshold of similarity.

Example 24 may include the subject matter of Example 23, wherein to perform the facial recognition analysis further comprises: comparison of each portion of the grid with a corresponding portion of the reference facial feature vector; identification of one or more portions of the grid that have directional matching patterns similar to the corresponding portion of the reference facial feature vector; generation of a directional histogram for each portion of the one or more portions of the grid; and concatenation of each directional histogram generated into a histogram of local matching directions for the image.

Example 25 may include the subject matter of Example 24, wherein to perform facial recognition analysis further comprises: identification of the face of the image as that of the person associated with the identifier of the reference facial feature vector, utilizing a binary classification system applied to the histogram of local matching directions.

Example 26 may include an apparatus for facial recognition comprising: means for receiving reference images having faces and corresponding identifiers of persons; means for performing gradient based feature extraction of the faces to determine directional matching patterns of the faces; means for generating facial feature vectors that represent the directional matching patterns of the faces; and means for storing the facial feature vectors of the reference images as reference facial feature vectors associated with the corresponding identifiers of the persons.

Example 27 may include the subject matter of Example 26, further comprising: means for receiving operational images having faces; means for performing gradient based feature extraction of the faces of the operational images, to determine directional matching patterns of the faces of the operational images; means for generating facial feature vectors that represent the directional matching patterns of the faces of the operational images; and means for performing facial recognition analysis on the faces of the operational images utilizing the facial feature vectors generated from the operational images as test facial feature vectors in comparison with the reference facial feature vectors to identify the faces in the operational images.

Example 28 may include the subject matter of Example 27, wherein the means for performing the gradient based feature extraction of a face further comprises: means for identifying a rectangle that encloses the face; means for detecting a first position of a left eye of the face within the rectangle and a second position of a right eye of the face within the rectangle; and means for normalizing the face to cause the left eye to relocate from the first position to a first reference position and the right eye to relocate from the second position to a second reference position; means for dividing the rectangle that encloses the face into a plurality of portions to form a grid over the face; and means for extracting gradient based features from each portion of the grid to determine directional matching patterns within the grid, wherein the directional matching patterns of each portion of the grid are represented by the facial feature vector of the face.

Example 29 may include the subject matter of Example 28, wherein means for extracting gradient based features of the plurality of portions, includes means for performing a histogram of oriented gradients (HOG) analysis of each portion of the plurality of portions of the image, or means for performing scale invariant feature transformation (SIFT) analysis of each portion of the plurality of portions of the image.

Example 30 may include the subject matter of either of Examples 28 or 29, wherein means for performing facial recognition analysis, further comprises: means for retrieving a reference facial feature vector associated with an identifier of a person; means for analyzing the reference facial feature vector against a test facial feature vector of an operational image to determine a level of similarity between the directional matching patterns represented by the reference facial feature vector and the directional matching patterns represented by the test facial feature vector; and means for identifying the face of the image as the person associated with the identifier, in response to determining that the level of similarity between the directional matching patterns represented by the reference facial feature vector and the directional matching patterns represented by the test facial feature vector is above a threshold of similarity.

Example 31 may include the subject matter of Example 30, wherein means for performing the facial recognition analysis further comprises: means for comparing each portion of the grid with a corresponding portion of the reference facial feature vector; means for identifying one or more portions of the grid that have directional matching patterns similar to the corresponding portion of the reference facial feature vector; means for generating a directional histogram for each portion of the one or more portions of the grid; and means for concatenating each directional histogram generated into a histogram of local matching directions for the image.

Example 32 may include the subject matter of Example 31, wherein means for performing facial recognition analysis further comprises means for identifying the face of the image as that of the person associated with the identifier of the reference facial feature vector, utilizing a binary classification system applied to the histogram of local matching directions.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the disclosure. This application is intended to cover any adaptations or variations of the embodiments discussed herein. Therefore, it is manifestly intended that the embodiments of the disclosure be limited only by the claims and the equivalents thereof.

What is claimed is:

1. An apparatus for computing, comprising:
   one or more computing processors;
   physical memory coupled with the one or more processors;
   a facial recognition module to be loaded into the physical memory and executed by the one or more processors, to:
   receive a reference facial feature vector associated with a reference image having a face corresponding to an identifier of a person, wherein the reference facial feature vector includes directional matching patterns of each portions of a grid of a rectangle that encloses a face in the reference image;
   receive a test facial feature vector associated with an operational image, wherein the test facial feature vector includes directional matching patterns of each portions of a grid of a rectangle that encloses a face in the operational image;
   analyze the reference facial feature vector against the test facial feature vector of the operational image to determine a level of similarity between the directional matching patterns represented by the reference facial feature vector and the directional matching patterns represented by the test facial feature vector, the analysis further including to:
   compare each portion of the operational image grid with a corresponding portion of the reference facial feature vector;
   identify one or more portions of the operational image grid that have directional matching patterns similar to the corresponding portion of the reference facial feature vector;
   generate a directional histogram for each identified portion of the one or more portions of the grid; and
   concatenate each directional histogram generated into a histogram of local matching directions for the image; and
   identify the face of the image as the person associated with the identifier, in response to determination that the level of similarity between the directional matching patterns represented by the reference facial feature vector and the directional matching patterns represented by the test facial feature vector is above a threshold of similarity.

2. The apparatus of claim 1, wherein the facial recognition module, as part of facial recognition analysis, is to further identify the face of the image as that of the person associated with the identifier of the reference facial feature vector, utilizing a binary classification system applied to the histogram of local matching directions.

3. The apparatus of claim 1, wherein the facial recognition module is further to: determine that a level of similarity between a test facial feature vector of an operational image and of a reference facial feature vector of a reference image is above a predefined threshold of similarity; and add the operational image of a person to a gallery of images of the person, based on the determination.

4. The apparatus of claim 3, wherein the predefined threshold of similarity is a first predefined threshold of similarity, and wherein to determine that the level of similarity is above the first predefined threshold of similarity further includes determination that the level of similarity is below a second predefined threshold of similarity.

5. The apparatus of claim 3, wherein to add the operational image to the gallery of images is further based on one or more of:
   a distance between eyes of the face in the image;
   alignment of the face in the image; or
   frontality of the face in the image.

6. The apparatus of claim 1, the apparatus further comprising:
   a facial feature extraction module, to be loaded into the physical memory and executed by the one or more processors, coupled to the facial recognition module, to:
   receive operational and reference images having faces, the reference images having corresponding identifiers of persons;
   perform gradient based feature extraction of the faces to determine directional matching patterns of the faces; and
   generate facial feature vectors that represent the directional matching patterns of the faces; and
   a facial registration module, to be loaded into the physical memory and executed by the one or more processors, coupled with the facial feature extraction module to:
   store the facial feature vectors of the reference images as reference facial feature vectors associated with the corresponding identifiers of the persons.

7. The apparatus of claim 6, wherein the facial feature extraction module is to perform a gradient based feature extraction of a face via:
   identification of a rectangle that encloses the face;
   detection of a first position of a left eye of the face within the rectangle and a second position of a right eye of the face within the rectangle; and
   normalization of the face to cause the left eye to relocate from the first position to a first reference position and the right eye to relocate from the second position to a second reference position.

8. The apparatus of claim 6, wherein the facial feature extraction module, as part of normalization of the face, rotates the image to align the face vertically or resizes the image to enlarge the face.

9. The apparatus of claim 6, wherein the facial feature extraction module, as part of the performance of the gradient based feature extractions, is further to:
   divide the rectangle that encloses the face into a plurality of portions to form a grid over the face; and
   extract gradient based features from each portion of the grid to determine directional matching patterns within the grid, wherein the directional matching patterns of each portion of the grid are represented by the facial feature vector of the face.

10. The apparatus of claim 9, wherein the facial feature extraction module, as part of the extraction of gradient based features of the plurality of portions, is to perform a histogram of oriented gradients (HOG) analysis of each portion of the plurality of portions of the image, or perform scale invariant feature transformation (SIFT) analysis of each portion of the plurality of portions of the image.

11. A computer-implemented method comprising:
   receiving, by a computing device, a reference facial feature vector associated with a reference image having a face corresponding to an identifier of a person, wherein the reference facial feature vector includes directional matching patterns of each portions of a grid of a rectangle that encloses a face in the reference image;
   receiving, by the computing device, a test facial feature vector associated with an operational image, wherein the test facial feature vector includes directional matching patterns of each portions of a grid of a rectangle that encloses a face in the operational image;
   analyzing, by the computing device, the reference facial feature vector against the test facial feature vector of the operational image to determine a level of similarity between the directional matching patterns represented by the reference facial feature vector and the directional matching patterns represented by the test facial feature vector, the analyzing further including:
      comparing, by the computing device, each portion of the operational image grid with a corresponding portion of the reference facial feature vector;
      identifying, by the computing device, one or more portions of the operational image grid that have directional matching patterns similar to the corresponding portion of the reference facial feature vector;
      generating, by the computing device, a directional histogram for each identified portion of the one or more portions of the grid; and
      concatenating, by the computing device, each directional histogram generated into a histogram of local matching directions for the image; and
   identifying, by the computing device, the face of the image as the person associated with the identifier, in response to determination that the level of similarity between the directional matching patterns represented by the reference facial feature vector and the directional matching patterns represented by the test facial feature vector is above a threshold of similarity.

12. The computer-implemented method of claim 11, wherein performing a gradient based feature extraction of a face further comprises:
   identifying, by the computing device, a rectangle that encloses the face;
   detecting, by the computing device, a first position of a left eye of the face within the rectangle and a second position of a right eye of the face within the rectangle;
   normalizing, by the computing device, the face to cause the left eye to relocate from the first position to a first reference position and the right eye to relocate from the second position to a second reference position;
   dividing the rectangle that encloses the face into a plurality of portions to form a grid over the face; and
   extracting gradient based features from each portion of the grid to determine directional matching patterns within the grid, wherein the directional matching patterns of each portion of the grid are represented by the facial feature vector of the face.

13. The computer-implemented method of claim 12, wherein extracting gradient based features of the plurality of portions, includes performing a histogram of oriented gradients (HOG) analysis of each portion of the plurality of portions of the image, or performing scale invariant feature transformation (SIFT) analysis of each portion of the plurality of portions of the image.

14. The computer-implemented method of claim 11, wherein performing facial recognition analysis further comprises identifying the face of the image as that of the person associated with the identifier of the reference facial feature vector, utilizing a binary classification system applied to the histogram of local matching directions.

15. One or more non-transitory computer-readable media having a plurality of instructions stored thereon, the instructions, in response to execution by a processor, to cause the processor to:
   receive a reference facial feature vector associated with a reference image having a face corresponding to an identifier of a person, wherein the reference facial feature vector includes directional matching patterns of each portions of a grid of a rectangle that encloses a face in the reference image;
   receive a test facial feature vector associated with an operational image, wherein the test facial feature vector includes directional matching patterns of each portions of a grid of a rectangle that encloses a face in the operational image;
   analyze the reference facial feature vector against the test facial feature vector of the operational image to determine a level of similarity between the directional matching patterns represented by the reference facial feature vector and the directional matching patterns represented by the test facial feature vector, the analyzing further including to:
      compare each portion of the operational image grid with a corresponding portion of the reference facial feature vector;
      identify one or more portions of the operational image grid that have directional matching patterns similar to the corresponding portion of the reference facial feature vector;
      generate a directional histogram for each identified portion of the one or more portions of the grid; and
      concatenate each directional histogram generated into a histogram of local matching directions for the image; and
   identify the face of the image as the person associated with the identifier, in response to determination that the level of similarity between the directional matching patterns represented by the reference facial feature vector and the directional matching patterns represented by the test facial feature vector is above a threshold of similarity.

16. The one or more non-transitory computer-readable media of claim 15, wherein the instructions, in response to execution by a processor, further cause the processor to:
   receive reference images having faces and corresponding identifiers of persons;
   perform gradient based feature extraction of the faces to determine directional matching patterns of the faces;
   generate facial feature vectors that represent the directional matching patterns of the faces; and store the facial feature vectors of the reference images as reference facial feature vectors associated with the corresponding identifiers of the persons.

17. The one or more non-transitory computer-readable media of claim 16, wherein to perform the gradient based feature extraction of a face further comprises:
   identification of a rectangle that encloses the face;
   detection of a first position of a left eye of the face within the rectangle and a second position of a right eye of the face within the rectangle;
   normalization of the face to cause the left eye to relocate from the first position to a first reference position and the right eye to relocate from the second position to a second reference position;
   division of the rectangle that encloses the face into a plurality of portions to form a grid over the face; and
   extraction of gradient based features from each portion of the grid to determine directional matching patterns within the grid, wherein the directional matching patterns of each portion of the grid are represented by the facial feature vector of the face.

18. The one or more non-transitory computer-readable media of claim 17, wherein extraction of gradient based features of the plurality of portions, includes performance of a histogram of oriented gradients (HOG) analysis of each portion of the plurality of portions of the image, or performance of a scale invariant feature transformation (SIFT) analysis of each portion of the plurality of portions of the image.

19. The one or more non-transitory computer-readable media of claim 15, wherein to perform facial recognition analysis further comprises: identification of the face of the image as that of the person associated with the identifier of the reference facial feature vector, utilizing a binary classification system applied to the histogram of local matching directions.

* * * * *